(12) United States Patent
Chen et al.

(10) Patent No.: US 12,529,924 B2
(45) Date of Patent: Jan. 20, 2026

(54) COLOR FILM SUBSTRATE, DISPLAY PANEL AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Jianjian Chen, Beijing (CN); Li Ma, Beijing (CN); Peng Chen, Beijing (CN); Huakun Du, Beijing (CN); Fengzhen Lv, Beijing (CN); Jingpeng Wang, Beijing (CN); Dongdong Zhang, Beijing (CN); Bo Zhang, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/292,327

(22) PCT Filed: Jun. 24, 2022

(86) PCT No.: PCT/CN2022/101250
§ 371 (c)(1),
(2) Date: Jan. 25, 2024

(87) PCT Pub. No.: WO2023/245654
PCT Pub. Date: Dec. 28, 2023

(65) Prior Publication Data
US 2025/0076699 A1  Mar. 6, 2025

(51) Int. Cl.
*G02F 1/1333* (2006.01)
*G02F 1/1335* (2006.01)
*G02F 1/1339* (2006.01)

(52) U.S. Cl.
CPC .. *G02F 1/133388* (2021.01); *G02F 1/133514* (2013.01); *G02F 1/13394* (2013.01); *G02F 2201/50* (2013.01)

(58) Field of Classification Search
CPC ......... G02F 1/133388; G02F 1/133514; G02F 1/13394; G02F 2201/50; G02F 1/1335
See application file for complete search history.

(56) References Cited

U.S. PATENT DOCUMENTS 9,841,630 B2   12/2017  Huang
10,620,472 B2  4/2020   Lin et al.
(Continued)

FOREIGN PATENT DOCUMENTS

CN   106154613 A   11/2016
CN   106597728 A   4/2017
(Continued)

OTHER PUBLICATIONS

International Search Report of PCT/CN2022/101250 dated Jan. 11, 2023 with English translation, (4p).
(Continued)

*Primary Examiner* — Kevin Quarterman
(74) *Attorney, Agent, or Firm* — Arch & Lake LLP; Zhangyuan Ji; Hao Li

(57) ABSTRACT

A color film substrate includes a first base substrate, a color film layer disposed at one side of the first base substrate, a protective layer disposed at one side of the color film layer away from the first base substrate, and a plurality of first spacers disposed corresponding to the plurality of first grooves. In the non-display region, a plurality of first grooves are provided at one surface of the protective layer away from the first base substrate.
A part of the first spacer is disposed in the first groove.

20 Claims, 6 Drawing Sheets

(56) References Cited

U.S. PATENT DOCUMENTS

| | | | |
|---|---|---|---|
| 11,251,134 B2* | 2/2022 | Higashisaka | H01L 25/07 |
| 11,415,839 B2* | 8/2022 | Yu | G02F 1/133516 |
| 2013/0250227 A1* | 9/2013 | Kira | G02F 1/1339 349/153 |
| 2017/0261815 A1 | 9/2017 | Huang | |
| 2018/0275458 A1* | 9/2018 | Lin | G02F 1/1333 |
| 2018/0321536 A1* | 11/2018 | Hu | G02F 1/133514 |
| 2021/0088835 A1 | 3/2021 | Wen et al. | |
| 2021/0333593 A1* | 10/2021 | Huang | G02F 1/13394 |

FOREIGN PATENT DOCUMENTS

| | | |
|---|---|---|
| CN | 107527923 A | 12/2017 |
| CN | 108427224 A | 8/2018 |
| CN | 110488529 A | 11/2019 |
| CN | 111061086 A | 4/2020 |
| CN | 111474757 A | 7/2020 |
| CN | 111596494 A | 8/2020 |
| WO | 2021031123 A1 | 2/2021 |

OTHER PUBLICATIONS

Written Opinion issued in Application No. PCT/CN2022/101250 dated Jan. 11, 2023 with English translation, (7p).

* cited by examiner

COLOR FILM SUBSTRATE, DISPLAY PANEL AND DISPLAY DEVICE

CROSS-REFERENCE TO RELATED APPLICATION

The present application is the U.S. National Stage of International Application No. PCT/CN2022/101250, filed on Jun. 24, 2022, the contents of which are incorporated herein by reference in their entireties for all purposes.

TECHNICAL FIELD

The present disclosure relates to the field of display technology, and specifically, to a color film substrate, a display panel and a display device.

BACKGROUND

The liquid crystal display (LCD) has the advantages of low power consumption, small size, and zero radiation, it can make users enjoy the best visual environment, and is more and more popular with the vast number of users.

However, the current liquid crystal display panel is prone to display defects.

It should be noted that the information disclosed in the background section above is only for enhancement of understanding of the background of the present disclosure, and thus may include information that does not constitute prior art known to those skilled in the art.

SUMMARY

The object of the present disclosure is to overcome the above deficiencies in the prior art, and provide a color film substrate, a display panel and a display device.

According to one aspect of the present disclosure, there is provided a color film substrate having a display region and a non-display region. The color film substrate includes:
  a first base substrate;
  a color film layer, disposed at one side of the first base substrate;
  a protective layer, disposed at one side of the color film layer away from the first base substrate, where in the non-display region, a plurality of first grooves are provided at one surface of the protective layer away from the first base substrate; and
  a plurality of first spacers, disposed corresponding to the plurality of first grooves, where a part of the first spacer is disposed in the first groove.

In one exemplary embodiment of the present disclosure, in the non-display region, a plurality of second grooves are provided on the color film layer, and the plurality of second grooves are disposed corresponding to the plurality of first grooves.

In one exemplary embodiment of the present disclosure, an orthographic projection of the first groove on the first base substrate is located in an orthographic projection of the second groove on the first base substrate.

In one exemplary embodiment of the present disclosure, the second groove has a larger depth than the first groove.

In one exemplary embodiment of the present disclosure, in the non-display region, a distance between one surface of the color film layer away from the first base substrate and the first base substrate increases as a distance between the surface of the color film layer away from the first base substrate and the display region increases, and a distance between the surface of the protective layer away from the first base substrate and the first base substrate increases as a distance between the surface of the protective layer away from the first base substrate and the display region increases.

In one exemplary embodiment of the present disclosure, depths of the plurality of first grooves are different, and the depths of the plurality of first grooves increase as distances between the plurality of first grooves and the display region increase; and depths of the plurality of second grooves are different, and the depths of the plurality of second grooves increase as distances between the plurality of second grooves and the display region increase.

In one exemplary embodiment of the present disclosure, the second groove is a through hole passing through the color film layer.

In one exemplary embodiment of the present disclosure, an orthographic projection of the first spacer on the first base substrate is located in an orthographic projection of a groove bottom wall of the first groove on the first base substrate.

In one exemplary embodiment of the present disclosure, the color film substrate further includes a second spacer that is disposed at one side of the protective layer away from the first base substrate and is located in the display region.

In one exemplary embodiment of the present disclosure, one surface of the second spacer away from the first base substrate is coplanar with one surface of the first spacer away from the first base substrate.

In one exemplary embodiment of the present disclosure, the first spacers are arranged in a same regular array as the second spacers.

In one exemplary embodiment of the present disclosure, the plurality of first spacers are arranged in a plurality of first columns along a first direction, the plurality of second spacers are arranged in a plurality of second columns along the first direction, and the plurality of first columns and the plurality of second columns are correspondingly disposed in a same column; the plurality of first spacers are arranged in a plurality of first rows along a second direction, the plurality of second spacers are arranged in a plurality of second rows along the second direction, and the plurality of first rows and the plurality of second rows are correspondingly disposed in a same row; and the first direction is intersected with the second direction, and the first direction and the second direction are parallel to one surface of the first base substrate close to the color film layer.

In one exemplary embodiment of the present disclosure, the protective layer includes:
  a first part, located in the non-display region, and located at the side of the color film layer away from the first base substrate; and
  a second part, connected to the first part, and located in the display region.

In this embodiment, a distance between one surface of the first part away from the first base substrate and the first base substrate is larger than a distance between one surface of the second part away from the first base substrate and the first base substrate; and a distance between the surface of the first part away from the first base substrate and the surface of the second part away from the first base substrate is less than or equal to 0.5 micrometers.

In one exemplary embodiment of the present disclosure, the surface of the second part away from the first base substrate is coplanar with one surface of the first groove away from the first base substrate.

In one exemplary embodiment of the present disclosure, the color film layer includes:

a first light-filtering portion, a second light-filtering portion and a third light-filtering portion that are disposed in the display region; and a dummy portion, disposed in the non-display region.

In one exemplary embodiment of the present disclosure, the color film substrate further includes a blocking layer that is disposed between the color film layer and the first base substrate. In the display region, a plurality of first vias are provided on the blocking layer, and a part of the first light-filtering portion, a part of the second light-filtering portion and a part of the third light-filtering portion are correspondingly disposed in the plurality of first vias. In the non-display region, the dummy portion is disposed at one side of the blocking layer away from the first base substrate.

In one exemplary embodiment of the present disclosure, an orthographic projection of the first light-filtering portion on the first base substrate is overlapped with an orthographic projection of the blocking layer on the first base substrate, an orthographic projection of the second light-filtering portion on the first base substrate is overlapped with the orthographic projection of the blocking layer on the first base substrate, and an orthographic projection of the third light-filtering portion on the first base substrate is overlapped with the orthographic projection of the blocking layer on the first base substrate.

In one exemplary embodiment of the present disclosure, the orthographic projection of the first light-filtering portion on the first base substrate is overlapped with orthographic projections, on the first base substrate, of the second light-filtering portion and the third light-filtering portion that are adjacent to the first light-filtering portion; and the orthographic projection of the second light-filtering portion on the first base substrate is overlapped with the orthographic projection, on the first base substrate, of the third light-filtering portion that is adjacent to the second light-filtering portion.

In one exemplary embodiment of the present disclosure, a part of the first light-filtering portion covers a part of the third light-filtering portion that is adjacent to the first light-filtering portion, a part of the first light-filtering portion covers a part of the second light-filtering portion that is adjacent to the first light-filtering portion, and the first light-filtering portion is provided in a same layer and formed in a same material as the dummy portion.

In one exemplary embodiment of the present disclosure, the first light-filtering portion is a red light-filtering portion, the second light-filtering portion is a green light-filtering portion, and the third light-filtering portion is a blue light-filtering portion.

In one exemplary embodiment of the present disclosure, the color film substrate is provided with a corner portion, and the non-display region is disposed at the corner portion.

In one exemplary embodiment of the present disclosure, at the corner portion, the display region is provided with a round chamfer, and a radius of the round chamfer is greater than or equal to 3 millimeters In one exemplary embodiment of the present disclosure, a plurality of strip-shaped grooves are provided at the surface of the protective layer away from the first base substrate, and at least a part of the strip-shaped grooves extend from the display region to the non-display region.

According to another aspect of the present disclosure, there is provided a display panel. The display panel includes:

a color film substrate, being the color film substrate described in any one of the foregoing;

an array substrate, disposed at one side of the first spacer away from the first base substrate;

a frame sealant, disposed between the array substrate and the color film substrate; and a liquid crystal layer, disposed between the array substrate and the color film substrate, and located in the frame sealant.

According to yet another aspect of the present disclosure, there is provided a display device. The display device includes the display panel described above.

It should be understood that both the foregoing general description and the following detailed description are exemplary and explanatory only and cannot limit the present disclosure.

BRIEF DESCRIPTION OF THE DRAWINGS

The accompanying drawings herein, which are incorporated in the specification and constitute a part of the specification, illustrate embodiments consistent with the present disclosure, and are used to explain the principles of the present disclosure together with the specification. It is apparent that the accompanying drawings described below are only some embodiments of the present disclosure, and other accompanying drawings can also be obtained according to these accompanying drawings without any creative efforts by those skilled in the art.

Figure 1:
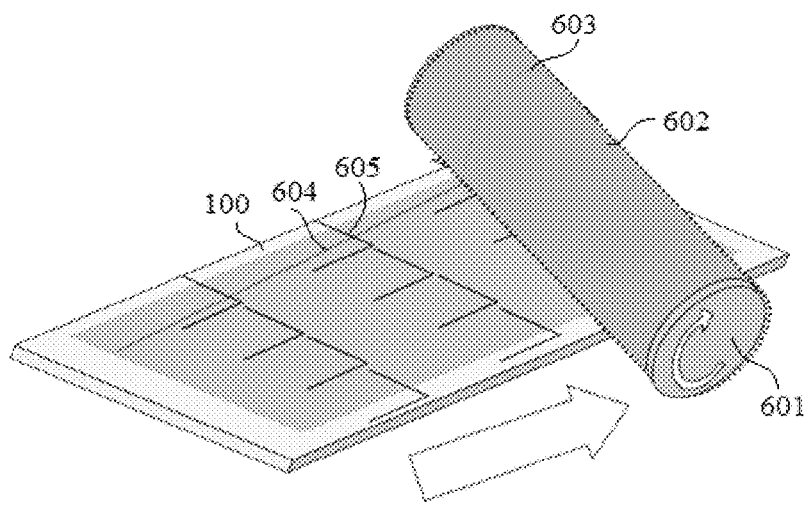
FIG. 1 is a schematic diagram of a principle of fibers of a lint cloth of a rubbing roller to produce damage.

DESCRIPTION OF REFERENCE NUMERALS 1. first base substrate;

2. blocking layer; 21. first via ;

3. color film layer; 31. first light-filtering portion; 32. second light-filtering portion; 33. third light-filtering portion; 34. dummy portion; 35. second groove;
4. protective layer; 41. first part; 42. second part; 43. first groove; 44. strip-shaped groove;
51. first spacer; 52. second spacer;
L1. first column; L2. second column;
H1. first row; H2. second row;
AA. display region; NA. non-display region;
X. first direction; Y. second direction; Z. third direction;
100. color film substrate; 200. array substrate; 300. liquid crystal layer; 400. frame sealant;
601. rubbing roller; 602. lint cloth; 603. damaged portion; 604. rubbing defect; 605. at segment difference.

DETAILED DESCRIPTION

Exemplary embodiments are now described more comprehensively with reference to the accompanying drawings. However, the exemplary embodiments can be implemented in various forms, and should not be construed as being limited to the examples set forth herein; on the contrary, these embodiments are provided to make the present disclosure be more comprehensive and complete, and convey the concepts of the exemplary embodiments comprehensively to those skilled in the art. The same reference numerals in the accompanying drawings denote the same or similar structures, and thus detailed description thereof will be omitted. In addition, the drawings are merely schematic illustrations of the present disclosure and are not necessarily drawn to scale.

Although the relative terms such as "above" and "below" are used in the specification to describe the relative relationship of one component of the icon to another component, these terms are used in the specification for convenience only, for example, the direction of the example described according to the accompanying drawing. It can be understood that if the device of the icon is flipped upside down, the component described "above" will become the component "below". When a structure is "above" another structure, it may mean that a structure is integrally formed on another structure, or that a structure is "directly" disposed on another structure, or that a structure is "indirectly" disposed through another structure.

The terms "a", "an", "the", "said", and "at least one" are used to represent the presence of one or more elements/components/etc. The terms "include" and "have" are used to indicate open inclusion and means that there may be additional elements/components/etc. in addition to the listed elements/components/etc. The terms "first", "second" and "third", etc. are used only as marks, but not a limitation on the number of objects thereof.

In this application, unless otherwise specified and limited, the term "connect" should be understood in a broad sense. For example, a "connection" may be a fixed connection, a detachable connection or an integral connection; it may be a direct connection, or an indirect connection via an intermediate medium. "And/or" is only an association relationship describing associated objects, indicating that there may be three relationships, for example, A and/or B, which indicates three cases: only A exists, A and B exist at the same time, and only B exists. Further, the character "/" herein generally indicates that the adjacently associated objects are in an "or" relationship.

The liquid crystal display panel may include an array substrate 200, a color film substrate 100, and a liquid crystal layer 300 therebetween. The array substrate 200 and the color film substrate 100 are each coated with an alignment film. After alignment treatment is performed to the alignment film, the array substrate 200 and the color film substrate 100 are formed into the liquid crystal display panel by means of cell-assembling. The existing alignment technique includes two types, namely a non-rubbing type and a rubbing type. The non-rubbing type alignment technique includes photo-alignment, ion beam alignment, and the like. Although the photo-alignment and ion beam alignment have good alignment effects, the production efficiency is low, the cost is high, and they are less applied to the LCD field. The rubbing type alignment is a contact-type directional mechanical rubbing that is performed on the surface of the alignment film with a lint cloth 602 roller, and the energy provided by rubbing the surface of the alignment film causes the molecular chain of the alignment film to be arranged in a directional manner due to extension, thereby controlling the alignment of the liquid crystal. The rubbing type alignment is widely used because of its short rubbing time and high mass productivity.

Figure 2:
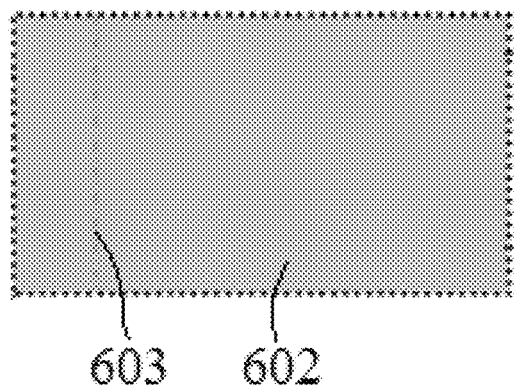
FIG. 2 is a schematic structural diagram of the lint cloth in FIG. 1.

The inventor has found that the main causes of the display defects of the liquid crystal display panel are, referring to FIGS. 1 and 2, the direction indicated by the arrow in FIG. 1 is a rubbing direction, and in the process of manufacturing the color film substrate 100, a part of the display region AA and a part of the non-display region NA are located in the rubbing direction, and when the segment difference at the segment difference 605 between the display region AA and the non-display region NA in the rubbing direction exceeds a threshold, the fibers of the lint cloth 602 of the rubbing roller 601 are damaged due to the variation in the press-in force of the capillary fibers on the surface of the lint cloth 602 and the variation in the contact strength between the capillary fibers on the surface of the lint cloth 602 and the alignment film when the rubbing alignment is performed. A damaged portion 603 is formed after the fibers of the lint cloth 602 are damaged, which leads to the rubbing defect 604 when the rubbing roller 601 performs the rubbing alignment on the subsequent display region AA, causing liquid crystal deflection disorder. In the black state, the liquid crystal is deflected, and a black line defect in the rubbing direction is formed.

An exemplary embodiment of the present disclosure provides a color film substrate 100. Referring to FIG. 6 to FIG. 9, the color film substrate 100 has a display region AA and a non-display region NA, and the color film substrate 100 may include a first base substrate 1, a color film layer 3, a protective layer 4, and a plurality of first spacers 51. The color film layer 3 is disposed at one side of the first base substrate 1. The protective layer 4 is disposed at one side of the color film layer 3 away from the first base substrate 1. In the non-display region NA, a plurality of first grooves 43 are provided at one surface of the protective layer 4 away from the first base substrate 1. A plurality of first spacers 51 are disposed corresponding to the plurality of first grooves 43, and a part of the first spacer 51 is disposed in the first groove 43.

In the color film substrate 100 of the present disclosure, on one hand, the color film layer 3 is disposed in the display region AA and the non-display region NA, which provides a relatively flat plane for the subsequently formed protective layer 4, so that the surface of the protective layer 4 away from the first base substrate 1 is flatter. When the rubbing alignment is performed, the variation in the press-in force of the capillary fibers on the surface of the lint cloth 602 and the variation in the contact strength between the capillary fibers on the surface of the lint cloth 602 and the protective layer 4 are reduced, and the damage to the fibers of the lint cloth 602 of the rubbing roller 601 is reduced, thereby improving the service life of the lint cloth 602 of the rubbing roller 601 and reducing the cost; also, the occurrence rate of the rubbing defect 604 in products can be reduced, the product yield can be improved, and the display effect of the display panel can be improved.

On the other hand, in the non-display region NA, the surface of the protective layer 4 away from the first base substrate 1 is provided with the plurality of first grooves 43, and the first spacer 51 is disposed in the first groove 43, so that the base surface for forming the first spacers 51 is low, avoiding the first spacers 51 disposed in the non-display region NA from protruding relative to the second spacers 52 disposed in the display region AA, thereby avoiding that the color film substrate 100 and the array substrate 200 cannot be cell-assembled well in the display region AA, and thus avoiding abnormal display of the display region AA.

In an exemplary embodiment, the material of the first base substrate 1 may include an inorganic material, for example, the inorganic material may be glass, quartz, metal, or the like. The material of the first base substrate 1 may further include an organic material, for example, the organic material may be a resin material such as polyimide, polycarbonate, polyacrylate, polyetherimide, polyethersulfone, polyethylene terephthalate, and polyethylene naphthalate. The first base substrate 1 may be formed by a plurality of material layers, for example, the first base substrate 1 may include a plurality of base layers, and the material of the base layer may be any one of the above materials. Of course, the first base substrate 1 may be provided as a single layer, and the material of the first base substrate 1 may be any one of the above materials.

Figure 3:
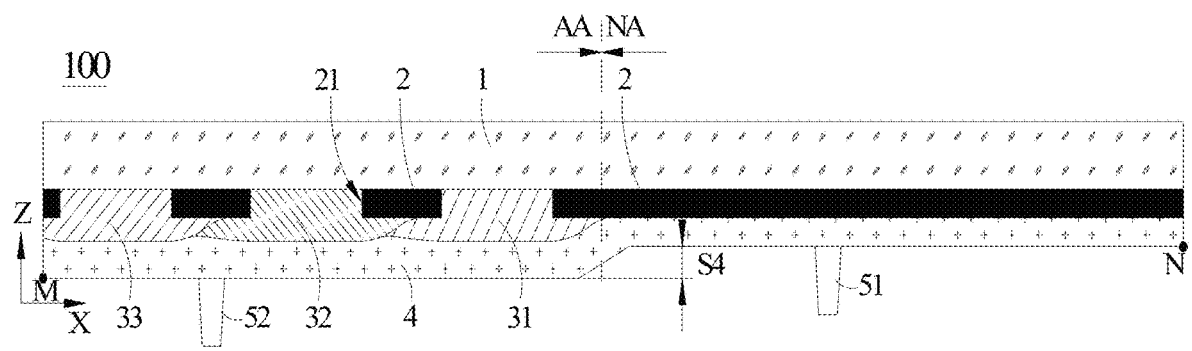
FIG. 3 is a schematic structural diagram of an example embodiment of a color film substrate in related arts.
Figure 5:
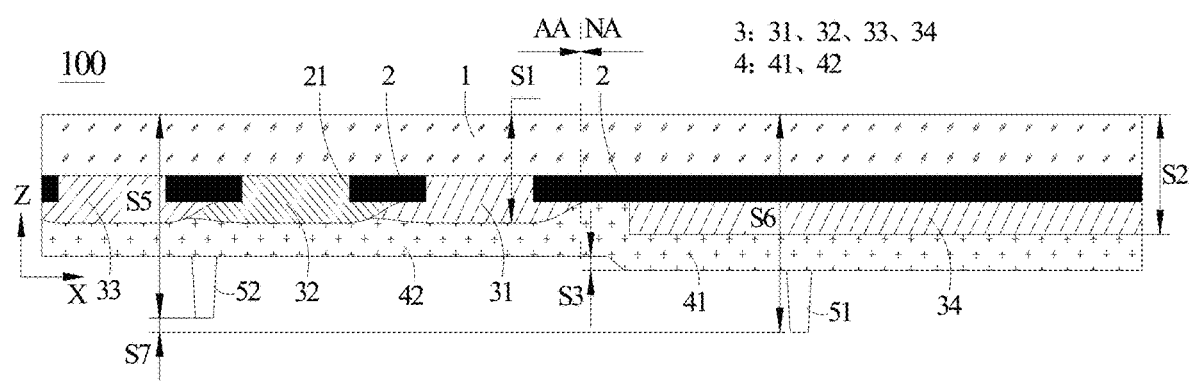
FIG. 5 is a schematic structural diagram of another example embodiment of a color film substrate in related arts.
Figure 6:
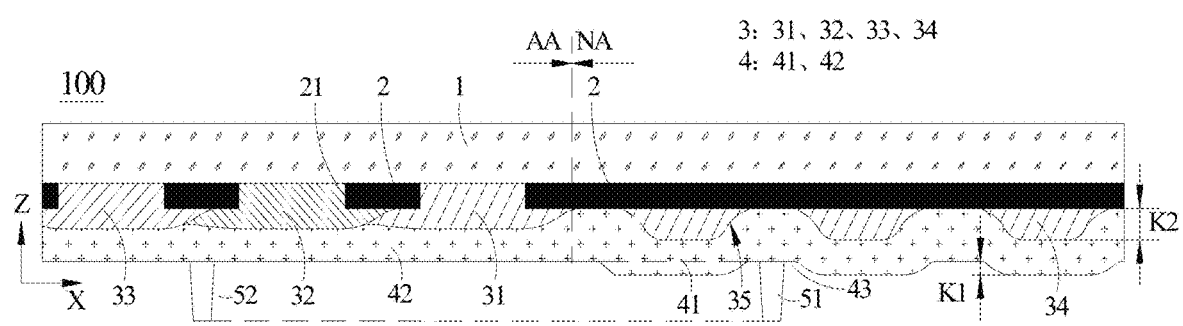
FIG. 6 is a schematic structural diagram of an example embodiment of a color film substrate of the present disclosure.

In an exemplary embodiment, as shown in FIGS. 3, 5, and 6, a blocking layer 2 is provided at one side of the first base substrate 1. In the display region AA, a plurality of first vias 21 are provided on the blocking layer 2, and the first via 21 passes through the blocking layer 2. The first via 21 may be provided as a rectangle shape, a plurality of first vias 21 arranged in a first direction X form one column, and three columns of first vias 21 may form a group. Of course, in some other exemplary embodiments of the present disclosure, the first via 21 may be provided as a circular shape, an oval shape, or other various polygonal shapes. The arrangement of the first vias 21 may be various, which is not repeated herein.

In the non-display region NA, no groove is disposed on the blocking layer 2, so that the blocking layer 2 may shield some devices on the periphery of the display panel which do not need to be displayed, such as a connecting wire.

The thickness of the blocking layer 2 is greater than or equal to 1.5 um, and is less than or equal to 3.5 um.

In an exemplary embodiment, referring to FIGS. 5 and 6, the color film layer 3 is provided at one side of the first base substrate 1, and the color film layer 3 may include a dummy portion 34, a first light-filtering portion 31, a second light-filtering portion 32, and a third light-filtering portion 33. The first light-filtering portion 31, the second light-filtering portion 32, and the third light-filtering portion 33 are disposed in the display region AA, and the dummy portion 34 is disposed in the non-display region NA.

Specifically, in the display region AA, a part of the first light-filtering portion 31, a part of the second light-filtering portion 32 and a part of the third light-filtering portion 33 are disposed in the first via 21. Another part of the first light-filtering portion 31, another part of the second light-filtering portion 32 and another part of the third light-filtering portion 33 are not disposed in the first via 21, i.e., the first light-filtering portion 31, the second light-filtering portion 32 and the third light-filtering portion 33 protrude relative to the blocking layer 2.

An orthographic projection of the first light-filtering portion 31 on the first base substrate 1 is overlapped with an orthographic projection of the blocking layer 2 on the first base substrate 1, specifically, the orthographic projection, on the first base substrate 1, of a part of the first light-filtering portion 31 protruding relative to the blocking layer 2 is overlapped with the orthographic projection of the blocking layer 2 on the first base substrate 1. An orthographic projection of the second light-filtering portion 32 on the first base substrate 1 is overlapped with the orthographic projection of the blocking layer 2 on the first base substrate 1, specifically, the orthographic projection, on the first base substrate 1, of a part of the second light-filtering portion 32 protruding relative to the blocking layer 2 is overlapped with the orthographic projection of the blocking layer 2 on the first base substrate 1. An orthographic projection of the third light-filtering portion 33 on the first base substrate 1 is overlapped with the orthographic projection of the blocking layer 2 on the first base substrate 1, specifically, the orthographic projection, on the first base substrate 1, of a part of the third light-filtering portion 33 protruding relative to the blocking layer 2 is overlapped with the orthographic projection of the blocking layer 2 on the first base substrate 1.

Further, the orthographic projection of the first light-filtering portion 31 on the first base substrate 1 is overlapped with the orthographic projection, on the first base substrate 1, of the second light-filtering portion 32 that is adjacent to the first light-filtering portion 31; specifically, the orthographic projection, on the first base substrate 1, of a part of the first light-filtering portion 31 protruding relative to the blocking layer 2 is overlapped with the orthographic projection, on the first base substrate 1, of a part of the second light-filtering portion 32 adjacent to the first light-filtering portion 31 that is protruding relative to the blocking layer 2. The orthographic projection of the first light-filtering portion 31 on the first base substrate 1 is overlapped with the orthographic projection, on the first base substrate 1, of the third light-filtering portion 33 that is adjacent to the first light-filtering portion 31; specifically, the orthographic projection, on the first base substrate 1, of a part of the first light-filtering portion 31 protruding relative to the blocking layer 2 is overlapped with the orthographic projection, on the first base substrate 1, of a part of the third light-filtering portion 33 adjacent to the first light-filtering portion 31 that is protruding relative to the blocking layer 2. The orthographic projection of the second light-filtering portion 32 on the first base substrate 1 is overlapped with the orthographic projection, on the first base substrate 1, of the third light-filtering portion 33 that is adjacent to the second light-filtering portion 32; specifically, the orthographic projection, on the first base substrate 1, of a part of the second light-filtering portion 32 protruding relative to the blocking layer 2 is overlapped with the orthographic projection, on the first base substrate 1, of a part of the third light-filtering portion 33 adjacent to the second light-filtering portion 32 that is protruding relative to the blocking layer 2.

The part of the first light-filtering portion 31 protruding relative to the blocking layer 2, the part of the second light-filtering portion 32 protruding relative to the blocking layer 2, and the part of the third light-filtering portion 33 protruding relative to the blocking layer 2 fill the recessed portion therebetween, so that in the display region AA, the surface of the color film layer 3 away from the first base substrate 1 is relatively flat. A relatively flat basis is provided for the subsequently formed protective layer 4, so that the surface of the subsequently formed protective layer 4 away from the first base substrate 1 is relatively flat. When the rubbing alignment is performed, the variation in the press-in force of the capillary fibers on the surface of the lint cloth 602 and the variation in the contact strength between the capillary fibers on the surface of the lint cloth 602 and the protective layer 4 are reduced, and the damage to the fibers of the lint cloth 602 of the rubbing roller 601 is reduced, thereby improving the service life of the lint cloth 602 of the rubbing roller 601 and reducing the cost; also, the occurrence rate of the rubbing detect 604 in products can be reduced, the product yield can be improved, and the display effect of the display panel can be improved.

Since the first light-filtering portion 31 is formed last, a part of the first light-filtering portion 31 covers a part of the third light-filtering portion 33 that is adjacent to the first light-filtering portion 31, specifically, a part of the first light-filtering portion 31 protruding relative to the blocking layer 2 covers a part of the third light-filtering portion 33 protruding relative to the blocking layer 2. A part of the first light-filtering portion 31 covers a part of the second light-filtering portion 32 that is adjacent to the first light-filtering portion 31, specifically, a part of the first light-filtering portion 31 protruding relative to the blocking layer 2 also covers a part of the second light-filtering portion 32 protruding relative to the blocking layer 2.

Further, the first light-filtering portion 31, the third light-filtering portion 33 and the second light-filtering portion 32 are all formed by the following processes: coating a light-filtering material to the entire layer (the display region AA and the non-display region NA), and then patterning the light-filtering material through a photolithography process to form the first light-filtering portion 31, the third light-filtering portion 33 and the second light-filtering portion 32. The material of the first light-filtering portion 31, the material of the third light-filtering portion 33 and the material of the second light-filtering portion 32 are all photoresist. If the dummy portion 34 is provided in the same layer and formed in the same material as the previously formed third light-filtering portion 33 or second light-filtering portion 32, it is necessary to remove the red light-filtering material layer from the non-display region NA when the first light-filtering portion 31 is formed subsequently, which will inevitably remove a part of the dummy portion 34. To ensure that the dummy portion 34 is not damaged, precise control is required, which is currently unattainable.

Therefore, the dummy portion 34 may be provided in the same layer and formed in the same material as the first light-filtering portion 31, that is, the dummy portion 34 may be formed through the same patterning process as the first light-filtering portion 31. Of course, in some other exemplary embodiments of the present disclosure, in the case where the second light-filtering portion 32 is formed last, the dummy portion 34 may be provided in the same layer and formed in the same material as the second light-filtering portion 32, that is, the dummy portion 34 may be formed through the same patterning process as the second light-filtering portion 32; in the case where the third light-filtering portion 33 is formed last, the dummy portion 34 may be provided in the same layer and formed in the same material as the third light-filtering portion 33, that is, the dummy portion 34 may be formed through the same patterning process as the third light-filtering portion 33.

The thicknesses of the first light-filtering portion 31 and the thicknesses of the dummy portion 34 are greater than or equal to 1.5 micrometers and are less than or equal to 3 micrometers. The thickness of the second light-filtering portion 32 is greater than or equal to 1.5 micrometers and is less than or equal to 3 micrometers. The thickness of the third light-filtering portion 33 is greater than or equal to 1.5 micrometers and is less than or equal to 3 micrometers.

Figure 8:
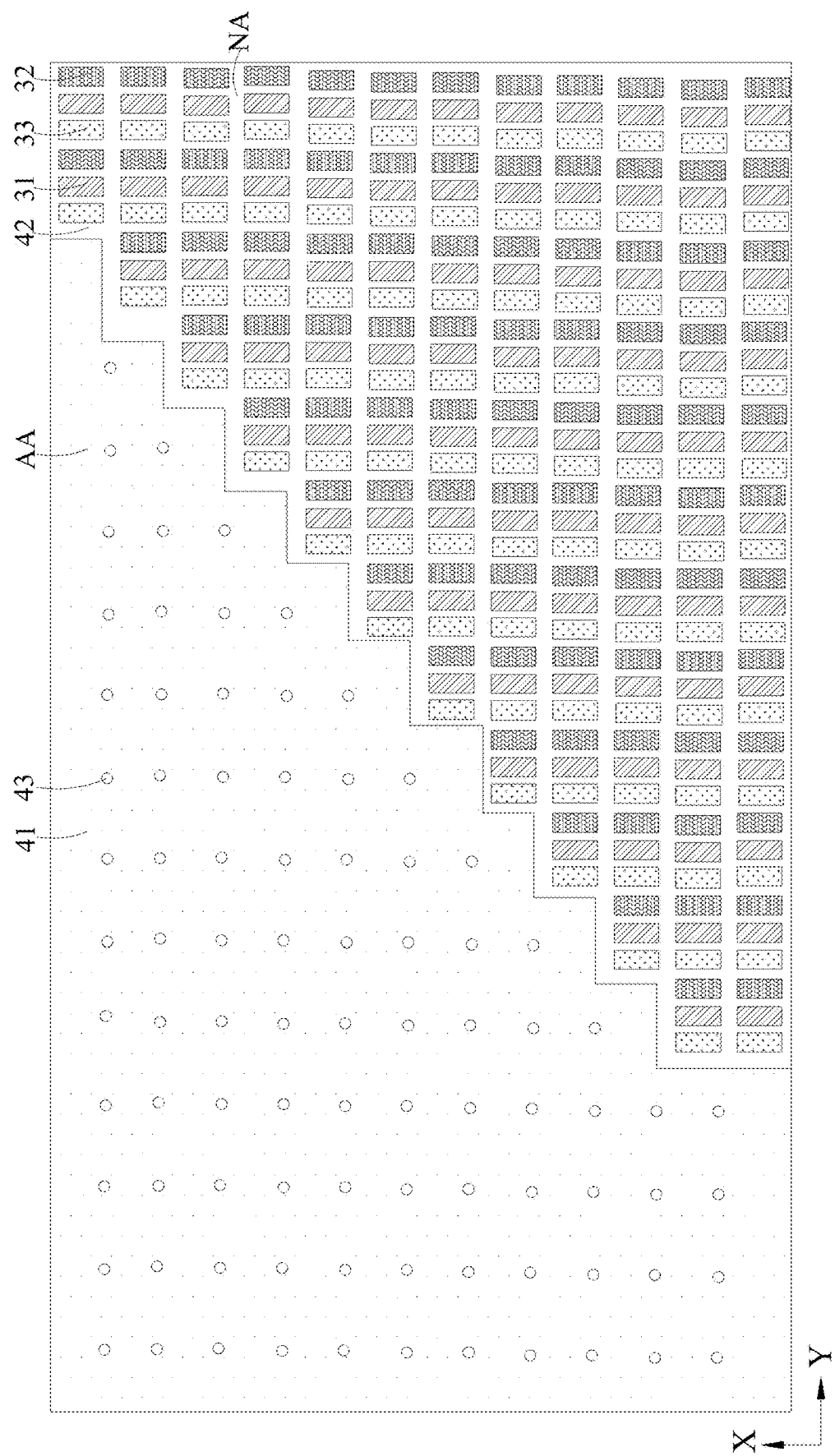
FIG. 8 is a schematic structural diagram of a top view of the color film substrate of FIG. 6 after a first groove is formed on a protective layer.
Figure 9:
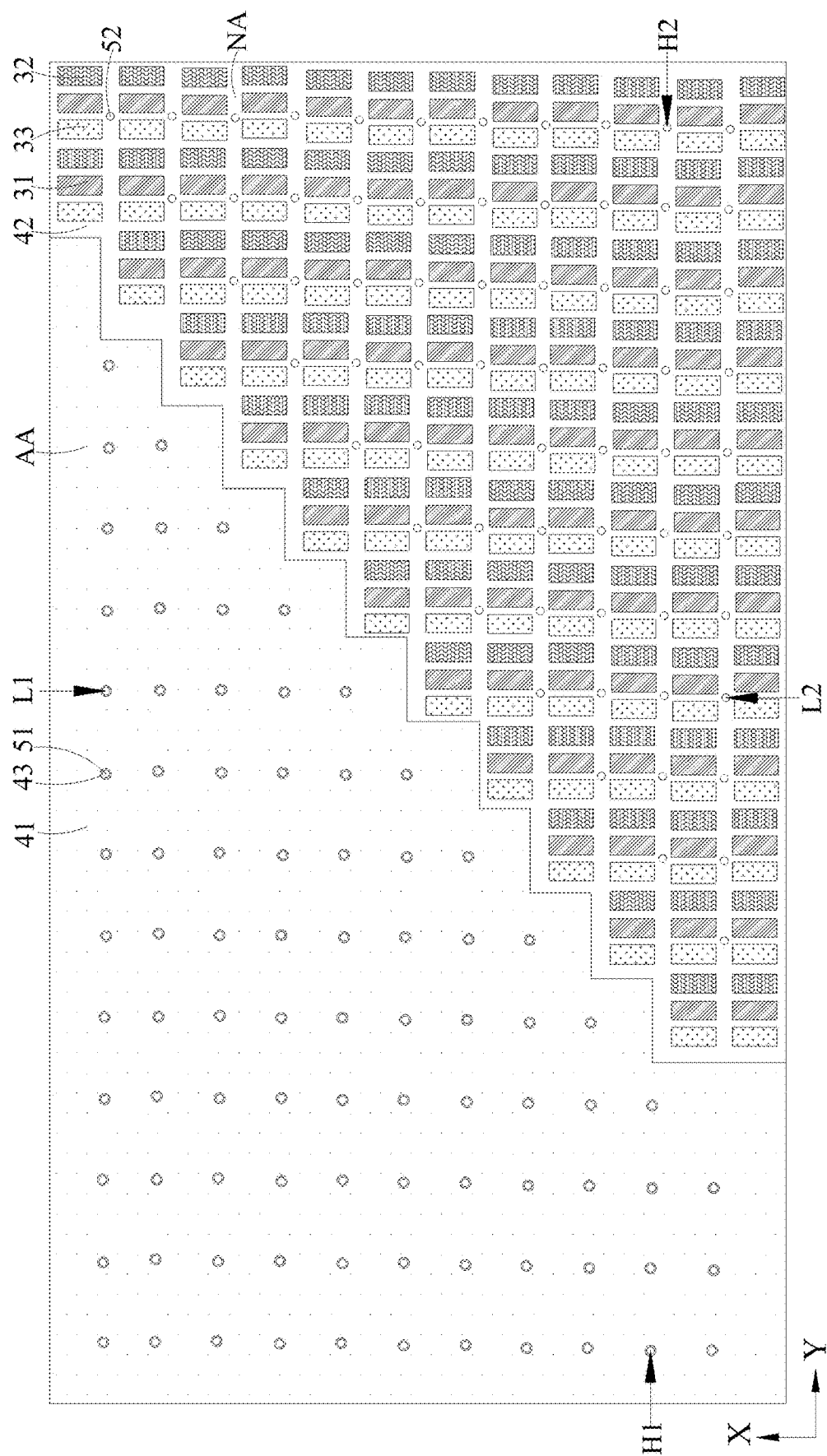
FIG. 9 is a schematic structural diagram of a top view of the color film substrate of FIG. 8 after a first spacer and a second spacer are formed on the basis of FIG. 8.

Referring to FIGS. 8 and 9, the first light-filtering portions 31 are disposed in a column of a plurality of first vias 21 arranged in the first direction X, and light may be emitted through the first light-filtering portions 31 to form a column of red sub-pixels; the second light-filtering portions 32 are disposed in a column of a plurality of first vias 21 arranged in the first direction X, and light may be emitted through the second light-filtering portions 32 to form a column of green sub-pixels; the third light-filtering portions 33 are disposed in a column of a plurality of first vias 21 arranged in the first direction X, and light may be emitted through the third light-filtering portions 33 to form a column of blue sub-pixels. A column of red sub-pixels, a column of green sub-pixels and a column of blue sub-pixels are sequentially arranged to form a group of sub-pixel columns. The plurality of groups of sub-pixel columns are sequentially arranged in the second direction Y.

Referring to FIG. 5, in the non-display region NA, since the first via 21 is not disposed on the blocking layer 2, the dummy portion 34 of the color film layer 3 is disposed at one side of the blocking layer 2 away from the first base substrate 1, so that the distance S2 between one surface of the dummy portion 34 away from the first base substrate 1 and the first base substrate 1 is greater than the distance S1 between one surface of the first light light-filtering portion 31 away from the first base substrate 1 and the first base substrate 1, so that the dummy portion 34 protrudes relative to the first light light-filtering portion 31.

It should be noted that the first light-filtering portion 31 may be a red light-filtering portion, the second light-filtering portion 32 may be a green light-filtering portion, and the third light-filtering portion 33 may be a blue light-filtering portion. Of course, the first light-filtering portion 31 may be a green light-filtering portion, the second light-filtering portion 32 may be a blue light-filtering portion, and the third light-filtering portion 33 may be a red light-filtering portion. There may be other setting methods, which are not described in detail herein.

Referring to FIGS. 3 and 5, the protective layer 4 is disposed at the side of the color film layer 3 away from the first base substrate 1. The protective layer 4 may include a first part 41 and a second part 42. The first part 41 is located in the non-display region NA, and the second part 42 is located in the display region AA. The material of the protective layer 4 may be polyimide (PI), or over coating (OC) glue, or of course, other materials may be selected according to the requirement, which is not described in detail herein.

Figure 10:
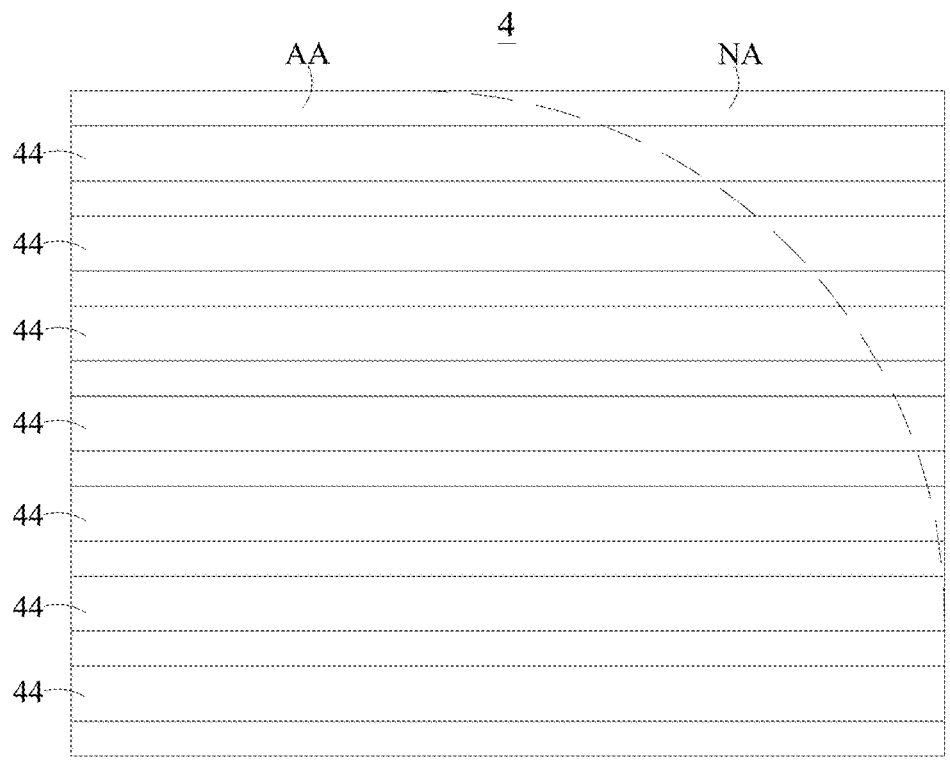
FIG. 10 is a schematic structural diagram of a protective layer.

Referring to FIG. 10, a plurality of strip-shaped grooves 44 may be disposed at the surface of the protective layer 4 away from the first base substrate 1, and at least a part of the strip-shaped grooves 44 extend from the display region AA to the non-display region NA. The plurality of strip-shaped grooves 44 are formed by rubbing alignment, so that the protective layer 4 is formed as an alignment film.

Figure 4:
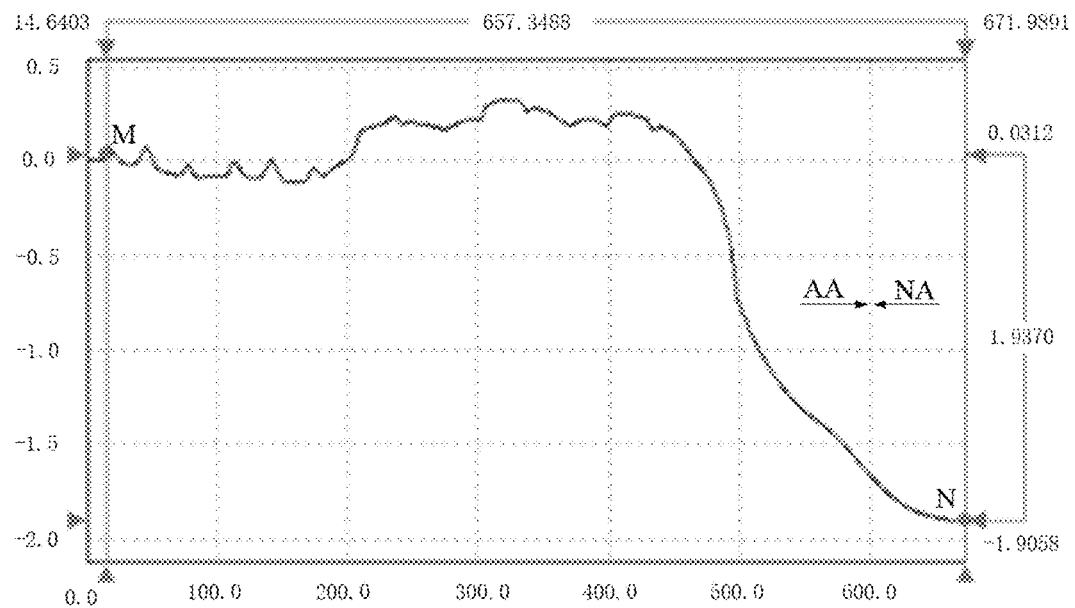
FIG. 4 is a schematic diagram of a segment difference curve from point M in the display region to point N in the non-display region in FIG. 3.

Referring to FIGS. 3 and 4, since there is no support of the dummy portion 34 in the non-display region NA, such that one surface of the second part 42 away from the first base substrate 1 protrudes relative to one surface of the first part 41 away from the first base substrate 1. Specifically, the distance S4 between the surface of the first part 41 away from the first base substrate 1 and the surface of the second part 42 away from the first base substrate 1 is about 2.0 micrometers, and it is far greater than a segment difference threshold allowed by the lint cloth 602. The fibers of the lint cloth 602 of the rubbing roller 601 are damaged due to the variation in the press-in force of the capillary fibers on the surface of the lint cloth 602 and the variation in the contact strength between the capillary fibers on the surface of the lint cloth 602 and the alignment film when the rubbing alignment is performed. The damaged portion 603 is formed after the fibers of the lint cloth 602 are damaged, which leads to the rubbing detect 604 when the rubbing roller 601 performs the rubbing alignment on the subsequent display region AA, causing liquid crystal deflection disorder. In the black state, the liquid crystal is deflected, and a black line defect in the rubbing direction is formed.

Specifically, referring to FIG. 4, the abscissa in the figure represents the position of the curve in the display panel, and since each point in the curve is on the straight line formed by connecting point M and point N, their positions are only represented by the abscissa in FIG. 4, and the unit is micrometer; the ordinate in the figure represents the height value of each point described above, and the unit is micrometer. The abscissa of point M of the display region AA is 14.6403 micrometers in FIG. 4, the ordinate of point M of the display region AA is 0.0312 micrometers in FIG. 4. The abscissa of point N of the non-display region NA is 671.9891 micrometers in FIG. 4, and the ordinate of point N of the non-display region NA is −1.9058 micrometers in FIG. 4. Therefore, the segment difference (height difference) between point M and point N is 1.9370 micrometers. The distance between point M and point N is 657.3488 micrometers. At the edge of the display region AA, i.e., the part of the display region AA close to the non-display region NA, since the material of the color film layer 2 may be accumulated at the edge, the height of the protective layer at the edge of the display region AA is higher than the height of the protective layer inside of the display region AA, so that the segment difference (height difference) between the display region AA and the non-display region NA is larger, as shown in FIG. 4, the segment difference (height difference) between the display region AA and the non-display region NA may be up to about 2.2 micrometers.

Referring to FIG. 5, due to the support of the dummy portion 34 in the non-display region NA, the surface of the first part 41 away from the first base substrate 1 protrudes relative to the surface of the second part 42 away from the first base substrate 1, that is, the distance between the surface of the first part 41 away from the first base substrate 1 and the first base substrate 1 is greater than the distance between the surface of the second part 42 away from the first base substrate 1 and the first base substrate 1. Specifically, the difference between the distance that is between the surface of the first part 41 away from the first base substrate 1 and the first base substrate 1 and the distance that is between the surface of the second part 42 away from the first base substrate 1 and the first base substrate 1 is equal to or less than 0.5 micrometers, that is, the distance S3 between the surface of the first part 41 away from the first base substrate 1 and the surface of the second part 42 away from the first base substrate 1 is equal to or less than 0.5 micrometers, and may be, for example, 0.2 micrometers, 0.25 micrometers, 0.3 micrometers, 0.32 micrometers, 0.36 micrometers, 0.4 micrometers, 0.43 micrometers, 0.47 micrometers, or the like.

With such an arrangement, the segment difference between the second part 42 of the display region AA and the first part 41 of the non-display region NA is reduced, so that the segment difference between the display region AA and the non-display region NA in the rubbing direction is within a threshold range. When the rubbing alignment is performed, the press-in force of the capillary fibers on the surface of the lint cloth 602, and the contact strength between the capillary fibers on the surface of the lint cloth 602 and the alignment film are not changed basically, the fibers of the lint cloth 602 of the rubbing roller 601 are not damaged. When the rubbing roller 601 performs rubbing alignment on the subsequent display region AA, the rubbing defect 604 does not occur and no liquid crystal deflection disorder is caused. In the black state, the liquid crystal is deflected, and no black line defect in the rubbing direction is formed.

The thickness of the protective layer 4 is greater than or equal to 1.5 micrometers, and is less than or equal to 4 micrometers.

Referring to FIG. 5, a plurality of first spacers 51 and a plurality of second spacers 52 are disposed at one side of the protective layer 4 away from the base substrate. The plurality of first spacers 51 are disposed in the non-display region NA, and the plurality of first spacers 51 are disposed at one side of the first part 41 away from the first base substrate 1. The plurality of second spacers 52 are disposed in the display region AA, and the plurality of second spacers 52 are disposed at one side of the second part 42 away from the first base substrate 1.

The thicknesses of the first spacer 51 and the thicknesses of the second spacer 52 are greater than or equal to 2 micrometers, and are less than or equal to 5 micrometers.

The plurality of first spacers 51 and the plurality of second spacer 52 are disposed in the same layer and formed in the same material, that is, the plurality of first spacers 51 and the plurality of second spacer 52 are formed through the same patterning process, so that the thickness of the plurality of first spacers 51 and the thickness of the plurality of second spacer 52 are the same, that is, the distance between one surface of the first spacer 51 close to the first part 41 and one surface of the first spacer 51 away from the first part 41 is equal to the distance between one surface of the second spacer 52 close to the first part 41 and one surface of the first spacer 51 away from the first part 41.

Since the surface of the first part 41 away from the first base substrate 1 protrudes relative to the surface of the second part 42 away from the first base substrate 1, the plurality of first spacers 51 protrude relative to the plurality of second spacers 52, that is, the distance S6 between the surface of the first spacer 51 away from the first base substrate 1 and the first base substrate 1 is greater than the distance S5 between the surface of the second spacer 52 away from the first base substrate 1 and the first base substrate 1, and the distance S7 between the surface of the first spacer 51 away from the first base substrate 1 and the surface of the second spacer 52 away from the first base substrate 1 is greater than or equal to 0.2 micrometers, and is less than or equal to 0.5 micrometers.

In this case, after the color film substrate 100 and the array substrate 200 are cell-assembled, the second spacers 52 located in the display region AA cannot be fitted with the array substrate 200, so that the cell thickness of the liquid crystal is abnormal (non-uniform), and the display of the display region AA is abnormal.

In an exemplary embodiment, with reference to FIG. 6, a second groove 35 may be provided on the dummy portion 34, the second groove 35 may be provided as a through hole passing through the dummy portion 34, and the second groove 35 may be formed through the same patterning process as the first light-filtering portion 31 located in the display region AA. Specifically, a red light-filtering material layer is formed at one side of the blocking layer 2 away from the first base substrate 1, then a mask plate is formed at one side of the red light-filtering material layer away from the first base substrate 1. The red light-filtering material layer is exposed and developed to retain the unexposed red light-filtering material layer, and remove the exposed red light-filtering material layer. The red light-filtering material retained in the display region AA forms the first light-filtering portion 31, and the red light-filtering material is removed in the non-display region NA to form the second groove 35.

Of course, in other exemplary embodiments of the present disclosure, the second groove 35 may be provided as a blind hole that does not pass through the dummy portion 34, the blind hole may not be formed through the same patterning process as the first light-filtering portion 31, and the second groove 35 may be formed through another exposure and development process after or before the first light-filtering portion 31 is formed.

The second groove 35 may include a groove bottom wall and a groove side wall. The groove bottom wall of the second groove 35 is provided as a plane, the groove side wall of the second groove 35 is provided as slope, and the height of the groove side wall of the second groove 35 in a third direction Z increases as the distance on a first surface between the groove side wall of the second groove 35 and the center of the second groove 35 increases, so that the second groove 35 is formed into a horn mouth structure with an opening portion larger than the bottom portion. The first surface is parallel to one surface of the first base substrate 1 close to the blocking layer 2.

In an exemplary embodiment, please continue to refer to FIG. 6, in the non-display region NA, the first groove 43 is disposed at one surface of the protective layer 4 away from the first base substrate 1, the first groove 43 is disposed opposite to the second groove 35, and the orthographic projection of the first groove 43 on the first base substrate 1 is located in the orthographic projection of the second groove 35 on the first base substrate 1. For example, the orthographic projection of the first groove 43 on the first base substrate 1 may be overlapped with the orthographic projection of the second groove 35 on the first base substrate 1, and the orthographic projection of the second groove 35 on the first base substrate 1 may cover and be greater than the orthographic projection of the first groove 43 on the first base substrate 1.

The first groove 43 may include a groove bottom wall and a groove side wall. The groove bottom wall of the first groove 43 is provided as a plane, the groove side wall of the first groove 43 is provided as a slope, and the height of the groove side wall of the first groove 43 in the third direction Z increases as the distance on a first surface between the groove side wall of the first groove 43 and the center of the first groove 43 increases, so that the first groove 43 is formed into a horn mouth structure with an opening portion larger than the bottom portion. The first surface is parallel to one surface of the first base substrate 1 close to the blocking layer 2.

Because the protective layer 4 has a certain planarization effect on the second groove 35, the depth K2 of the second groove 35 is greater than the depth K1 of the first groove 43, that is, the distance K2 between the groove bottom wall of the second groove 35 and the surface of the dummy portion 34 away from the first base substrate 1 is greater than the distance K1 between the groove bottom wall of the first groove 43 and the surface of the protective layer 4 away from the first base substrate 1.

Figure 7:
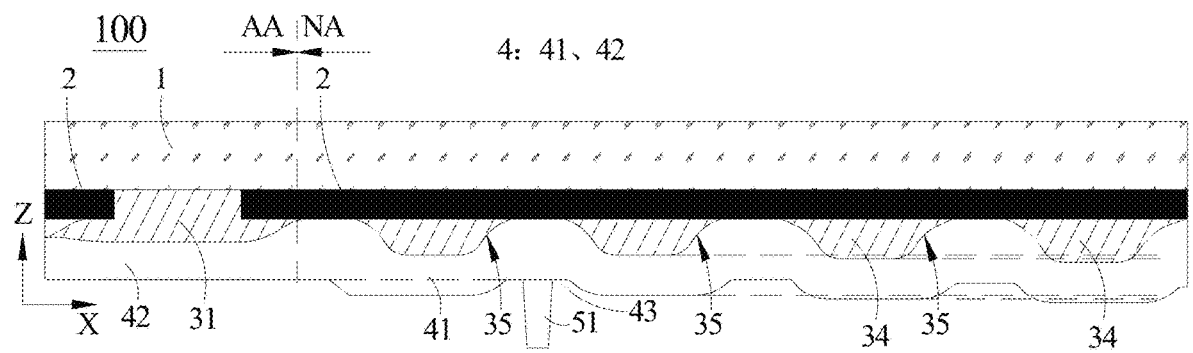
FIG. 7 is a schematic structural diagram of another example embodiment of a color film substrate of the present disclosure.

Referring to FIG. 7, the heights of the dummy portion 34 and the first part 41 are shown by comparison of dotted lines in the figure. Because the dummy portion 34 and the first light-filtering portion 31 are formed through one patterning process, the materials of the dummy portion 34 and the first light-filtering portion 31 are photoresist, and the photoresist has fluidity and can be accumulated at the edge of the first base substrate 1, so that in the non-display region NA, the distance between one surface of the color film layer 3 away from the first base substrate 1 and the first base substrate 1 increases as the distance between the surface of the color film layer 3 away from the first base substrate 1 and the display region AA increases, and specifically, the distance between one surface of the dummy portion 34 away from the first base substrate 1 and the first base substrate 1 increases as the distance between the surface of the dummy portion 34 away from the first base substrate 1 and the display region AA increases. The height difference of the surface of the dummy portion 34 away from the first base substrate 1 is greater than or equal to 0.5 micrometers and is less than or equal to 1 micrometer. Thus, in the non-display region NA, the distance between one surface of the subsequently formed protective layer 4 away from the first base substrate 1 and the first base substrate 1 increases as the distance between the surface of the subsequently formed protective layer 4 away from the first base substrate 1 and the display region AA increases, and specifically, the distance between one surface of the first part 41 away from the first base substrate 1 and the first base substrate 1 increases as the distance between the surface of the first part 41 away from the first base substrate 1 and the display region AA increases.

In order to ensure that one surface of the plurality of the subsequently formed first spacers 51 away from the first base substrate 1 is coplanar, the depths of the plurality of first grooves 43 increase as the distances between the plurality of first grooves 43 and the display region AA increase, that is, the depths of the plurality of first grooves 43 are different, and the farther the first groove 43 is away from the display region AA, the deeper the depth of the first groove 43 is, so that a base layer located substantially on the same plane can be provided for the first spacers 51. The depths of the first grooves 43 are about 1.5 to 3.0 micrometers, and may be, for example, 1.6 micrometers, 1.9 micrometers, 2.1 micrometers, 2.5 micrometers, and 2.8 micrometers. The depth difference of the first grooves 43 is greater than or equal to 0.2 micrometers and is less than or equal to 0.5 micrometers.

Furthermore, the first groove 43 is formed on the protective layer 4, because the second groove 35 is provided on the color film layer 3 and the first groove 43 is naturally formed at the position where the second groove 35 is formed after the protective layer 4 is deposited, therefore, in order to ensure that the depths of the plurality of first grooves 43 increase as the distances between the plurality of first grooves 43 and the display region AA increase, the depths of the plurality of second grooves 35 may be provided as a structure that the depths of the plurality of second grooves 35 increase as the distances between the plurality of second grooves 35 and the display region AA increase. Then, the depths of the subsequently formed first grooves 43 may form a structure that the depths of the first grooves 43 increase as the distances between the first grooves 43 and the display region AA increase.

Further, referring to FIGS. 6 and 7, one surface of the second part 42 away from the first base substrate 1 and one surface of the first groove 43 away from the first base substrate 1 are connected by a dotted line in FIG. 6 to indicate that the two surfaces are coplanar; and in FIG. 6, one surface of the first spacer 51 away from the first base substrate 1 and one surface of the second spacer 52 away from the first base substrate 1 are connected by a dotted line to indicate that the two surfaces are coplanar. One surface of the second part 42 of the protective layer 4 away from the first base substrate 1 is coplanar with one surface of the first groove 43 away from the first base substrate 1. Such an arrangement can provide reference surfaces substantially in the same plane for the second spacers 52 of the display region AA and the first spacers 51 of the non-display region NA, and provide a basis for that one surface of the subsequently formed first spacer 51 away from the first base substrate 1 and one surface of the subsequently formed second spacer 52 away from the first base substrate 1 are coplanar.

It should be noted that coplanar mentioned in this disclosure is not completely in the same plane, and due to process, error and the like, the actual product cannot achieve complete coplanar, but has certain error. For example, if the distance between one surface of the first spacer 51 away from the first base substrate 1 and the first base substrate 1 is P1, the distance between one surface of the second spacer 52 away from the first base substrate 1 and the first base substrate 1 is P2, and one surface of the first spacer 51 away from the first base substrate 1 and one surface of the second spacer 52 away from the first base substrate 1 are coplanar, P1 is required to be equal to P2, but P1 cannot be completely equal to P2, there is certain error between P1 and P2, and the error value A may be $\Delta=(P1-P2)/P1 \leq \pm 5\%$.

In an exemplary embodiment, a part of the first spacer 51 is disposed in the first groove 43, and another part of the first spacer 51 protrudes relative to the first groove 43. The cross-sectional area of the section of the first spacer 51 parallel to one surface of the first base substrate 1 close to the color film layer 3 decreases as the distance between the section of the first spacer 51 and the first base substrate 1 increases, that is, the first spacer 51 is provided as a structure that the first spacer 51 gradually decreases in the direction away from the first base substrate 1.

The orthographic projection of the first spacer 51 on the first base substrate 1 is located in the orthographic projection of the first groove 43 on the first base substrate 1. Specifically, the orthographic projection of the first spacer 51 on the first base substrate 1 may coincide with the orthographic projection of the groove bottom wall of the first groove 43 on the first base substrate 1, and the orthographic projection of the groove bottom wall of the first groove 43 on the first base substrate 1 may also cover and be larger than the orthographic projection of the first spacer 51 on the first base substrate 1. For example, the diameter of one surface of the first spacer 51 close to the first base substrate 1 is 19 micrometers, and the diameter of the groove bottom wall of the first groove 43 is 32 micrometers.

Since the side wall of the first groove 43 is provided as an inclined surface, if the first spacer 51 is disposed on the side wall of the first groove 43, the height of the first spacer 51 is inevitably increased, so that the height of the first spacer 51 is higher than that of the second spacer 52, and after the color film substrate 100 and the array substrate 200 are cell-assembled, the second spacer 52 located in the display region AA cannot be fitted with the array substrate 200, causing that the display of the display region AA is abnormal.

In an exemplary embodiment, referring to FIGS. 8 and 9, the first spacers 51 are arranged in the same regular array as the second spacers 52. For example, the distance between two adjacent second spacers 52 is the same as the distance between two adjacent first spacers 51. Specifically, in the display region AA, one first light-filtering portion 31, one second light-filtering portion 32 and one third light-filtering portion 33 which are adjacent in the second direction Y form a group of light-filtering portions, and one second spacer 52 is disposed on one side of the group of light-filtering portions, so that the distance between two adjacent second spacers 52 is equal to the distance between two adjacent groups of light-filtering portions; and in the non-display region NA, the distance between two adjacent first spacers 51 is also equal to the distance between two adjacent groups of light-filtering portions.

Furthermore, the plurality of first spacers 51 are arranged in a plurality of first columns L1 along the first direction X, the plurality of second spacers 52 are arranged in a plurality of second columns L2 along the first direction X, and the plurality of first columns L1 and the plurality of second columns L2 are correspondingly disposed in the same column, that is, one column of first spacers 51 and one column of second spacers 52 form one column in the first direction X. Of course, in the case where no first spacer 51 is disposed, a plurality of second spacers 52 may form one column alone.

The plurality of first spacers 51 are arranged in a plurality of first rows H1 along the second direction Y, the plurality of second spacers 52 are arranged in a plurality of second rows H2 along the second direction Y, and the plurality of first rows H1 and the plurality of second rows H2 are correspondingly disposed in the same row, that is, one row of the first spacers 51 and one row of the second spacers 52 form one row in the second direction Y. Of course, in the case where no first spacer 51 is disposed, a plurality of second spacers 52 may form one row alone.

It should be noted that the same row and the same column described above are design requirements, but in an actual product, due to process errors, it is difficult to achieve exactly the same row and the same column, but there may be certain errors. Taking the first spacer 51 as an example, the diameter of the first spacer 51 is R, and the distance between the center point of the plurality of first spacers 51 and the designed row center line or column center line is within 5% R, the plurality of first spacers 51 can be considered as the in same row or the same column.

With such an arrangement, the design is convenient, and the supporting forces of the color film substrate 100 at the display region AA and the non-display region NA are uniform and consistent. Also, even if there is a difference in height between the first spacers 51 and the second spacers 52 in one column or one row, display defects occur only in the one column or one row; furthermore, the difference in height between the first spacer 51 and the second spacer 52 is due to the difference in height of the protective layer, i.e. there is a segment difference on the protective layer, which may only damage one column of fibers of the lint cloth 602, so that the formed rubbing defect 604 is also in only one column, and the rubbing defect 604 with a large area is not caused.

It should be noted that, in the specification, the first direction X intersects with the second direction Y. For example, the first direction X and the second direction Y may be perpendicular; and the first direction X and the second direction Y are parallel to one surface of the first base substrate 1 close to the color film layer 3, and the third direction Z is perpendicular to the surface of the first base substrate 1 close to the color film layer 3.

Further, referring to FIGS. 8 and 9, the color film substrate 100 is provided with a corner portion, and the non-display region NA is provided at the corner portion, so that the first grooves 43 and the first spacers 51 are disposed at the corner portion. Of course, the second grooves 35 are also located at the corner portion.

At the corner portion, the display region AA is provided with a round chamfer, i.e., inside the round chamfer is the display region AA and outside the round chamfer is the non-display region NA. The radius of the round chamfer is greater than or equal to 3 millimeters. For example, the radius of the round chamfer may be 3.2 millimeters, 3.5 millimeters, 7 millimeters, 13 millimeters, 15 millimeters, 20 millimeters, 22 millimeters, 23 millimeters, 27 millimeters, 30 millimeters, 35 millimeters, etc.

It should be noted that the larger the radius of the round chamfer is, the more round the corner portion will be, and the more obvious the observation of human eyes.

Of course, in other exemplary embodiments of the present disclosure, a circle of the non-display region NA may be disposed at the perimeter of the color film substrate 100, that is, the non-display region NA surrounds the display region AA, and the first grooves 43 and the first spacers 51 may be disposed in the circle of the non-display region NA. The non-display region NA may also be disposed in a part of the edge region of the color film substrate 100, the non-display region NA may be used to place a camera and other devices, and the first grooves 43 and the first spacers 51 are disposed in the part of the non-display region NA.

It should be noted that the data in the description are merely exemplary and does not limit the present disclosure, and may be changed as needed.

Figure 11:
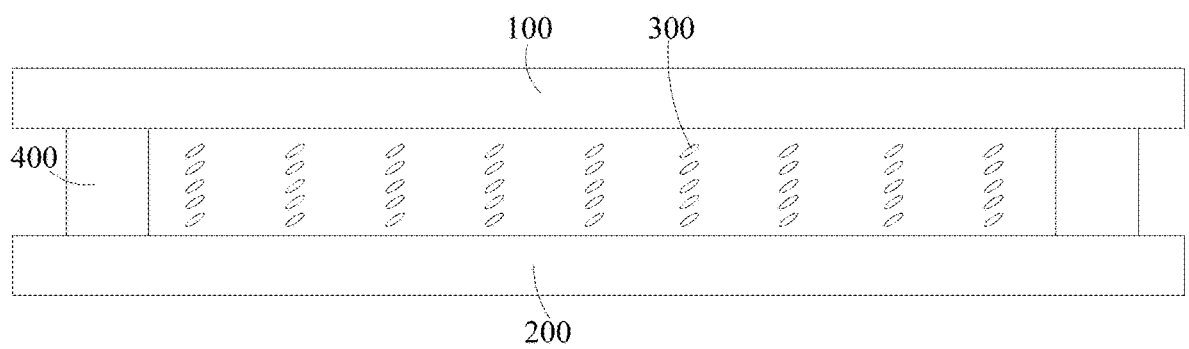
FIG. 11 is a schematic structural diagram of a display panel of the present disclosure.

Based on the same inventive concept, an exemplary embodiment of the present disclosure provides a display panel. Referring to FIG. 11, the display panel may include any one of the color film substrates 100 described above, and the specific structure of the color film substrate 100 is described in detail above, which therefore are not repeated herein.

The display panel may further include an array substrate 200, the array substrate 200 is disposed opposite to the color film substrate 100, and one surface of the first spacer 51 away from the first base substrate 1 and one surface of the second spacer 52 away from the first base substrate 1 are attached to the array substrate 200 to support the array substrate 200 and the color film substrate 100, causing that an accommodating space is formed between the array substrate 200 and the color film substrate 100.

Further, the display panel may further include a frame sealant 400. The sealant tape 400 is also disposed between the array substrate 200 and the color film substrate 100. The frame sealant 400 is disposed in a ring shape to define a boundary of an accommodating space, and a liquid crystal layer 300 is accommodated in the accommodating space.

The display panel may be a reflection type liquid crystal display (RLCD) panel, that is, the array substrate 200 may include a second base substrate and a plurality of switch units arranged in an array and disposed on one side of the second substrate close to the color film substrate 100. The switch unit may include a channel portion, a gate, a source/drain, a pixel electrode, and a common electrode. A reflective layer is disposed on one side of the switch unit away from the second base substrate.

The display panel may be a self-luminous liquid crystal display panel. The display panel may include a second base substrate and a plurality of switch units arranged in an array and disposed on one side of the second substrate close to the color film substrate 100. The switch unit may include a channel portion, a gate, a source/drain, a pixel electrode, and a common electrode, and may further include a backlight module. The backlight module may be disposed between the second base substrate and the switch unit.

Based on the same inventive concept, an exemplary embodiment of the present disclosure provides a display device, which may include any one of the display panels described above. The specific structure of the display panel has been described in detail above, which therefore is not repeated herein.

The specific type of the display device is not particularly limited, and may be any type of display devices commonly used in the art. Specifically, for example, the display device may be a mobile device such as a mobile phone, a wearable device such as a watch, a VR device, and the like. Those skilled in the art may make corresponding selection according to the specific use of the display device, which is not repeated herein.

It should be noted that, in addition to the display panel, the display device further includes other necessary parts and components. Taking the display as an example, specifically, other necessary parts and components may be a housing, a circuit board, a power line, and the like. Those skilled in the art may make corresponding supplement according to the specific use requirements of the display device, which is not repeated herein.

Compared with the prior art, the beneficial effects of the display device and the display panel provided by the exemplary embodiments of the present disclosure are the same as the beneficial effects of the color film substrate 100 provided by the above exemplary embodiments, which are not repeated herein.

Those skilled in the art will readily come up with other embodiments of the present disclosure after considering the specification and practicing the disclosure disclosed herein. This disclosure is intended to cover any variations, uses, or adaptive changes of the present disclosure that follow the general principles of the present disclosure and include the common general knowledge or conventional technical means in the technical field not disclosed by the present disclosure. The specification and implementation examples are only considered illustrative.

What is claimed is:

1. A color film substrate having a display region and a non-display region, wherein the color film substrate comprises:
   a first base substrate;
   a color film layer, disposed at one side of the first base substrate;
   a protective layer, disposed at one side of the color film layer farthest away from the first base substrate, wherein in the non-display region, a plurality of first grooves are provided at one surface of the protective layer farthest away from the first base substrate; and a plurality of first spacers, disposed corresponding to the plurality of first grooves, wherein a part of the first spacer is disposed in the first groove.

2. The color film substrate according to claim 1, wherein in the non-display region, a plurality of second grooves are provided on the color film layer, and the plurality of second grooves are disposed corresponding to the plurality of first grooves.

3. The color film substrate according to claim 2, wherein an orthographic projection of the first groove on the first base substrate is located in an orthographic projection of the second groove on the first base substrate.

4. The color film substrate according to claim 2, wherein the second groove has a larger depth than the first groove; or
the second groove is a through hole passing through the color film layer.

5. The color film substrate according to claim 2, wherein in the non-display region, a distance between one surface of the color film layer farthest away from the first base substrate and the first base substrate increases as a distance between the surface of the color film layer farthest away from the first base substrate and the display region increases, and a distance between the surface of the protective layer farthest away from the first base substrate and the first base substrate increases as a distance between the surface of the protective layer farthest away from the first base substrate and the display region increases.

6. The color film substrate according to claim 5, wherein depths of the plurality of first grooves are different, and the depths of the plurality of first grooves increase as distances between the plurality of first grooves and the display region increase; and depths of the plurality of second grooves are different, and the depths of the plurality of second grooves increase as distances between the plurality of second grooves and the display region increase.

7. The color film substrate according to claim 1, wherein an orthographic projection of the first spacer on the first base substrate is located in an orthographic projection of a groove bottom wall of the first groove on the first base substrate.

8. The color film substrate according to claim 1, wherein the color film substrate further comprises:
a second spacer, disposed at one side of the protective layer farthest away from the first base substrate, and located in the display region.

9. The color film substrate according to claim 8, wherein one surface of the second spacer farthest away from the first base substrate is coplanar with one surface of the first spacer farthest away from the first base substrate; or the first spacers are arranged in a same regular array as the second spacers.

10. The color film substrate according to claim 9, wherein the plurality of first spacers are arranged in a plurality of first columns along a first direction, the plurality of second spacers are arranged in a plurality of second columns along the first direction, and the plurality of first columns are provided in one-to-one correspondence with the plurality of second columns, and any one of the first columns is disposed in a same column as a corresponding one of the second columns;

the plurality of first spacers are arranged in a plurality of first rows along a second direction, the plurality of second spacers are arranged in a plurality of second rows along the second direction, and the plurality of first rows are provided in one-to-one correspondence with the plurality of second rows, and any one of the first rows is disposed in a same row as a corresponding one of the second rows; and the first direction is intersected with the second direction, and the first direction and the second direction are parallel to one surface of the first base substrate closest to the color film layer.

11. The color film substrate according to claim 1, wherein the protective layer comprises:
a first part, located in the non-display region, and located at the side of the color film layer farthest away from the first base substrate; and
a second part, connected to the first part, and located in the display region; wherein
a distance between one surface of the first part farthest away from the first base substrate and the first base substrate is larger than a distance between one surface of the second part farthest away from the first base substrate and the first base substrate; and a distance between the surface of the first part farthest away from the first base substrate and the surface of the second part farthest away from the first base substrate is less than or equal to 0.5 micrometers.

12. The color film substrate according to claim 11, wherein the surface of the second part farthest away from the first base substrate is coplanar with one surface of the first groove farthest away from the first base substrate.

13. The color film substrate according to claim 1, wherein the color film layer comprises:
a first light-filtering portion, a second light-filtering portion and a third light-filtering portion, disposed in the display region; and
a dummy portion, disposed in the non-display region.

14. The color film substrate according to claim 13, wherein the color film substrate further comprises:
a blocking layer, disposed between the color film layer and the first base substrate; wherein
in the display region, a plurality of first vias are provided on the blocking layer, and a part of the first light-filtering portion, a part of the second light-filtering portion and a part of the third light-filtering portion are correspondingly disposed in the plurality of first vias; and
in the non-display region, the dummy portion is disposed at one side of the blocking layer farthest away from the first base substrate;
or
the first light-filtering portion is a red light-filtering portion, the second light-filtering portion is a green light-filtering portion, and the third light-filtering portion is a blue light-filtering portion.

15. The color film substrate according to claim 14, wherein an orthographic projection of the first light-filtering portion on the first base substrate is overlapped with an orthographic projection of the blocking layer on the first base substrate, an orthographic projection of the second light-filtering portion on the first base substrate is overlapped with the orthographic projection of the blocking layer on the first base substrate, and
an orthographic projection of the third light-filtering portion on the first base substrate is overlapped with the orthographic projection of the blocking layer on the first base substrate.

16. The color film substrate according to claim 15, wherein the orthographic projection of the first light-filtering portion on the first base substrate is overlapped with orthographic projections, on the first base substrate, of the second light-filtering portion and the third light-filtering portion that are adjacent to the first light-filtering portion; and the orthographic projection of the second light-filtering portion on the first base substrate is overlapped with the orthographic projection, on the first base substrate, of the third light-filtering portion that is adjacent to the second light-filtering portion.

17. The color film substrate according to claim 16, wherein the first light-filtering portion partially covers the third light-filtering portion that is adjacent to the first light-filtering portion, the first light-filtering portion partially covers the second light-filtering portion that is adjacent to the first light-filtering portion, and the first light-filtering portion is provided in a same layer and formed in a same material as the dummy portion.

18. The color film substrate according to claim 1, wherein the color film substrate is provided with a corner portion, and the non-display region is disposed at the corner portion; and at the corner portion, the display region is provided with a round chamfer, and a radius of the round chamfer is greater than or equal to 3 millimeters; or a plurality of strip-shaped grooves are provided at the surface of the protective layer farthest away from the first base substrate, and at least a part of the strip-shaped grooves extend from the display region to the non-display region.

19. A display panel, comprising:
a color film substrate, having a display region and a non-display region, and comprising:
a first base substrate;
a color film layer, disposed at one side of the first base substrate;
a protective layer, disposed at one side of the color film layer farthest away from the first base substrate, wherein in the non-display region, a plurality of first grooves are provided at one surface of the protective layer farthest away from the first base substrate; and
a plurality of first spacers, disposed corresponding to the plurality of first grooves, wherein a part of the first spacer is disposed in the first groove;
an array substrate, disposed at one side of the first spacer farthest away from the first base substrate;
a frame sealant, disposed between the array substrate and the color film substrate; and
a liquid crystal layer, disposed between the array substrate and the color film substrate, and located in the frame sealant.

20. A display device, comprising a display panel, wherein the display panel comprises:
a color film substrate, having a display region and a non-display region, and comprising:
a first base substrate;
a color film layer, disposed at one side of the first base substrate;
a protective layer, disposed at one side of the color film layer farthest away from the first base substrate, wherein in the non-display region, a plurality of first grooves are provided at one surface of the protective layer farthest away from the first base substrate; and
a plurality of first spacers, disposed corresponding to the plurality of first grooves, wherein a part of the first spacer is disposed in the first groove;
an array substrate, disposed at one side of the first spacer farthest away from the first base substrate;
a frame sealant, disposed between the array substrate and the color film substrate; and
a liquid crystal layer, disposed between the array substrate and the color film substrate, and located in the frame sealant.

* * * * *